US008985815B2

(12) United States Patent
Chen et al.

(10) Patent No.: US 8,985,815 B2
(45) Date of Patent: Mar. 24, 2015

(54) LIGHT BULB WITH UPWARD AND DOWNWARD FACING LEDS HAVING HEAT DISSIPATION

(75) Inventors: Yi-Hung Chen, New Taipei (TW); Shih-Pin Chen, Taipei (TW); Huan-Hsiang Huang, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 229 days.

(21) Appl. No.: 13/620,158

(22) Filed: Sep. 14, 2012

(65) Prior Publication Data

US 2014/0078723 A1 Mar. 20, 2014

(51) Int. Cl.

| | |
|---|---|
| ***F21V 29/00*** | (2006.01) |
| ***B60Q 1/06*** | (2006.01) |
| ***H01R 33/00*** | (2006.01) |
| ***F21S 13/10*** | (2006.01) |
| ***F21V 3/00*** | (2006.01) |
| ***F21V 15/00*** | (2006.01) |
| ***F21V 5/00*** | (2006.01) |
| ***F21K 99/00*** | (2010.01) |
| ***F21V 23/02*** | (2006.01) |
| *F21Y 101/02* | (2006.01) |
| *F21Y 103/02* | (2006.01) |

(52) U.S. Cl.

CPC ............... *F21V 23/023* (2013.01); *F21K 9/135* (2013.01); *F21V 3/00* (2013.01); *F21V 29/71* (2013.01); *F21Y 2101/02* (2013.01); *F21Y 2103/022* (2013.01)

USPC ........... 362/294; 362/373; 362/650; 362/363; 362/311.02

(58) Field of Classification Search

CPC .................... F21Y 2105/001; F21Y 2105/003; F21Y 2111/008; F21Y 2111/007

USPC ................. 362/373, 294, 264, 218, 650, 363, 362/311.02, 311.06, 307, 249.02, 457, 362/217.13, 217.17

See application file for complete search history.

(56) References Cited

U.S. PATENT DOCUMENTS

| | | | | |
|---|---|---|---|---|
| 5,577,832 | A * | 11/1996 | Lodhie | 362/249.03 |
| 5,669,703 | A * | 9/1997 | Wheeler et al. | 362/249.04 |
| 5,749,646 | A * | 5/1998 | Brittell | 362/231 |
| 5,806,965 | A * | 9/1998 | Deese | 362/249.04 |
| 5,917,709 | A * | 6/1999 | Johnson et al. | 361/803 |
| 5,929,788 | A * | 7/1999 | Vukosic | 340/908.1 |
| 6,598,996 | B1 * | 7/2003 | Lodhie | 362/249.05 |
| 7,367,692 | B2 * | 5/2008 | Maxik | 362/307 |

(Continued)

*Primary Examiner* — Ismael Negron
*Assistant Examiner* — Erin Kryukova
(74) *Attorney, Agent, or Firm* — Muncy, Geissler, Olds & Lowe, P.C.

(57) ABSTRACT

A light bulb includes a lamp base unit including a base, an electrically insulative hollow column fastened to the base, a heat sink surrounding the electrically insulative hollow column, a light-transmissive shade surrounding the upper part of the metal cylindrical heat sink and a power supply module electrically connected to the base, a light source module including a metal holder plate, a first circuit board with upward-facing LEDs, a second circuit board with downward-facing LEDs, a first adapter board, a second adapter board, a positioning block and a heat transfer pad and supported on the heat sink in the light-transmissive shade, and a lamp shell fastened to the metal holder plate and capped on the light-transmissive shade. During operation of the LEDs, waste heat can be quickly dissipated into the outside open air through the mounting lugs of the metal holder plate, the heat transfer pad and the heat sink.

9 Claims, 5 Drawing Sheets

(56) References Cited

U.S. PATENT DOCUMENTS

| | | | | |
|---|---|---|---|---|
| 8,227,962 | B1 * | 7/2012 | Su | 313/46 |
| 8,545,052 | B2 * | 10/2013 | Hu | 362/249.02 |
| 8,704,432 | B2 * | 4/2014 | Jin | 313/46 |
| 2011/0198984 | A1 * | 8/2011 | Van De Ven | 313/318.01 |
| 2011/0286200 | A1 * | 11/2011 | Iimura et al. | 362/84 |
| 2012/0187818 | A1 * | 7/2012 | Chuang | 313/46 |
| 2013/0039071 | A1 * | 2/2013 | Wang | 362/294 |
| 2013/0058098 | A1 * | 3/2013 | Kim et al. | 362/294 |
| 2013/0294082 | A1 * | 11/2013 | Matsuda et al. | 362/293 |

* cited by examiner

LIGHT BULB WITH UPWARD AND DOWNWARD FACING LEDS HAVING HEAT DISSIPATION

BACKGROUND OF THE INVENTION

1. Field of the Invention

The present invention relates to lighting technology and more particularly, to a light bulb, which comprises a first circuit board with upward-facing LEDs and a second circuit board with downward-facing LEDs, a metal holder plate set between the first circuit board and the second circuit board to support a light-transmissive shade and a light transmitting lamp shell and to dissipate heat.

2. Description of the Related Art

Since the invention of a first practical electric light bulb by Thomas Alva Edison (Feb. 11, 1847-Oct. 18, 1931), the use of electric light bulb has more than one hundred years of history. An incandescent light bulb, incandescent lamp or incandescent light globe is an electric light which produces light with a tungsten filament wire heated to a high temperature by an electric current through it, until it glows. A tungsten filament-based electric light bulb throws light in an omnidirectional manner, i.e., in all directions. Thus, it quickly replaces conventional dangerous candles and kerosene lamps. Nowadays, many different omnidirectional brilliant light sources are commercially available.

However, tungsten filament-based electric light bulbs consume a large amount of power during operation. It has a low luminous efficacy, i.e., less units of lumens per watt (lm/W). Nowadays, many energy-saving light sources have been created and are intensively used to replace conventional tungsten filament-based electric light bulbs.

The most popularly accepted energy-saving light is a compact fluorescent lamp, also called compact fluorescent light and compact fluorescent tube, designed to replace an incandescent lamp. An energy-saving light of this kind uses a tube which is curved or folded to fit into the space of an incandescent bulb, and a compact electronic ballast in the base of the lamp. Under same illumination conditions, an energy-saving light consumes less electric energy than a conventional tungsten filament-based electric light bulb. However, when compared to a T5 fluorescent lamp, a ballast-based energy-saving light consumes much electric energy.

Conventional energy-saving lights still has drawbacks. At first, an energy-saving light generates small amount of magnetic waves (4.67 milligauss) and microwaves (3.3 $\mu W/cm^2$ per every watt) during operation. Further, an energy-saving light does not allow light intensity adjustment. Further, an energy-saving light contains a small amount of toxic mercury. Delivery of energy-saving lights or disposing of used energy-saving lights must be carefully handled.

Further, LED lights draw less energy, which makes them more cost effective to use. Many light fixture manufacturers create LED lights for illumination. LED lights are more rugged and damage-resistant than compact fluorescents and incandescent bulbs; however, they are very heat sensitive. Excessive heat or inappropriate applications dramatically reduce both light output and lifetime of LED lights. Further, LED lights are directional. For illumination application, heat dissipation and light dispersion must be properly designed.

A conventional LED light bulb is known comprising a heat sink disposed at the bottom side, a circuit board mounted at the top side of the heat sink, a plurality of light-emitting diodes installed in the circuit board, and a transparent or translucent lamp shell covering the circuit board and the light-emitting diodes. According to this design of LED light bulb, the light-emitting diodes face upward (forward). Due to limited light-emitting angle, a LED light bulb of this design is normally used with a reflector that is mounted around the lamp socket holding the LED light bulb. However, because the light-emitting diodes are directional, the reflector cannot reflect much light rays toward the desired direction. Further, the simple heat sink design cannot effectively and rapidly dissipate waste heat from the light-emitting diodes during the operation of the LED light bulb.

SUMMARY OF THE INVENTION

The present invention has been accomplished under the circumstances in view. It is therefore the main object of the present invention to provide a light bulb, which dissipates waste heat rapidly during operation and has the characteristics of high component positioning stability and enhanced illumination.

To achieve this and other objects of the present invention, a light bulb comprises a lamp base unit comprising an electrically insulative hollow column, a base, a metal cylindrical heat sink, a light-transmissive shade and a power supply module, a light source module comprising a metal holder plate, a first circuit board with upward-facing LEDs, a second circuit board with downward-facing LEDs, a first adapter board, a second adapter board, a positioning block and a heat transfer pad, and a light transmitting lamp shell. The metal holder plate of the light source module is kept in close contact with the first circuit board and the second circuit board for quick dissipation of waste heat produced during operation of the LEDs, and works to hold the light-transmissive shade and the lamp shell firmly in place.

Further, in addition to the functioning of the metal holder plate to dissipate waste heat from the first circuit board and the second circuit board, the heat transfer pad and the heat sink can also dissipate waste heat from the second circuit board. Further, the metal holder plate comprises a plurality of mounting lugs for securing the light-transmissive shade and the lamp sell firmly in place. The mounting lugs also work as radiation fins to dissipate waste heat during operation of the LEDs. Further, the number of the mounting lugs can be determined subject to the installation quantity of the LEDs. Thus, if the quantity or power watt of the LEDs is increased, the total heat dissipation surface area of the mounting lugs can be relatively increased.

Further, the first adapter board and the second adapter board are respectively electrically connected to the first circuit board and the second circuit board by spot welding, and the first adapter board and the second adapter board are electrically connected together by means of the electric connector. By means of inserting the electric connector into a respective connector hole at the first circuit board, the metal holder plate and the second circuit board and then bonding the electric connector to the second circuit board and then bonding the first adapter board to the upright contact pins of the electric connector, the electric connection is done.

Further, the upper part of the outer perimeter of the heat sink is tapered for reflecting the light emitted by the downward-facing LEDs of the second circuit board, enhancing lateral and rear side illumination that passes through the light-transmissive shade.

DETAILED DESCRIPTION OF THE PREFERRED EMBODIMENT

Figure 1:
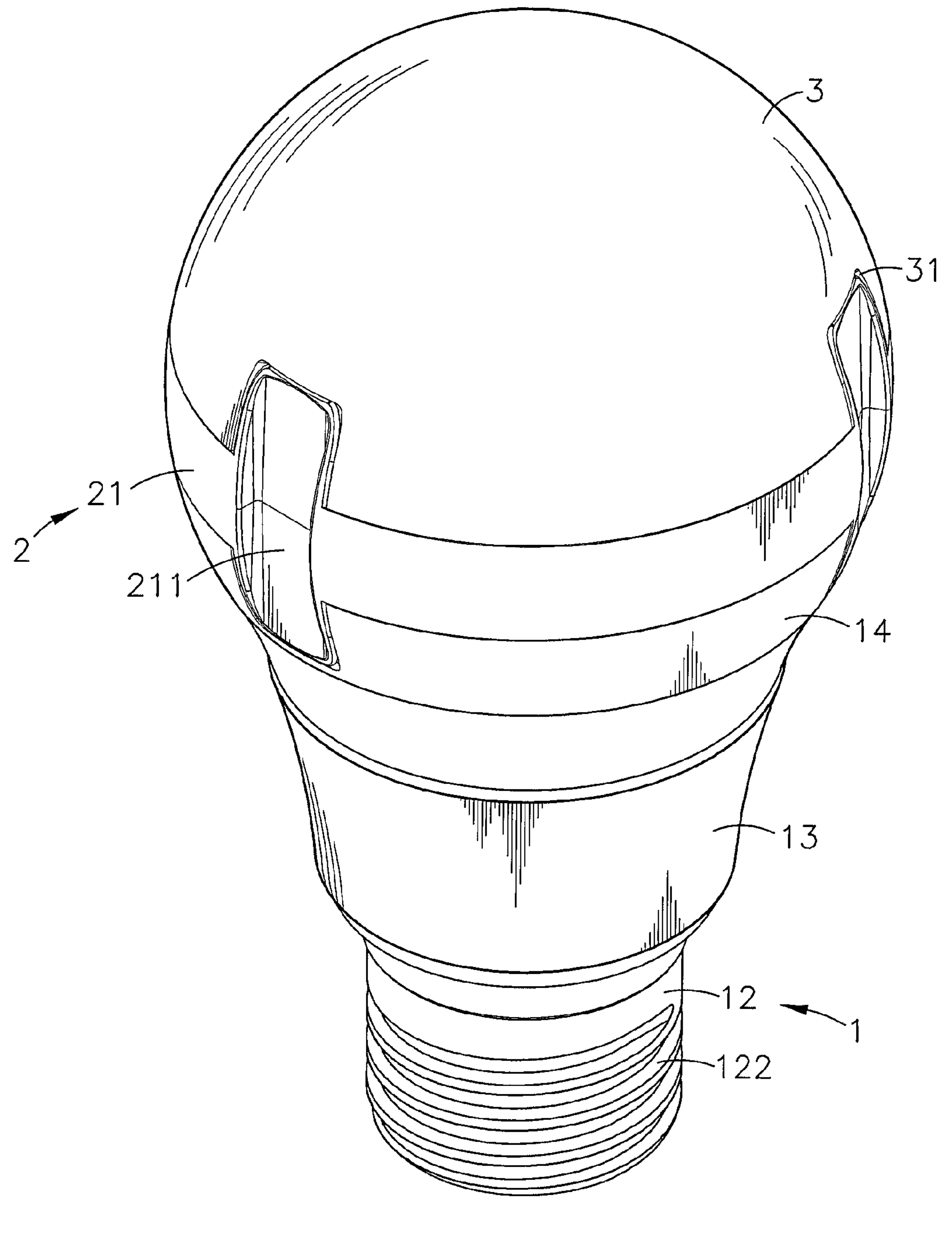
FIG. 1 is an elevational view of a light bulb in accordance with the present invention.
Figure 2:
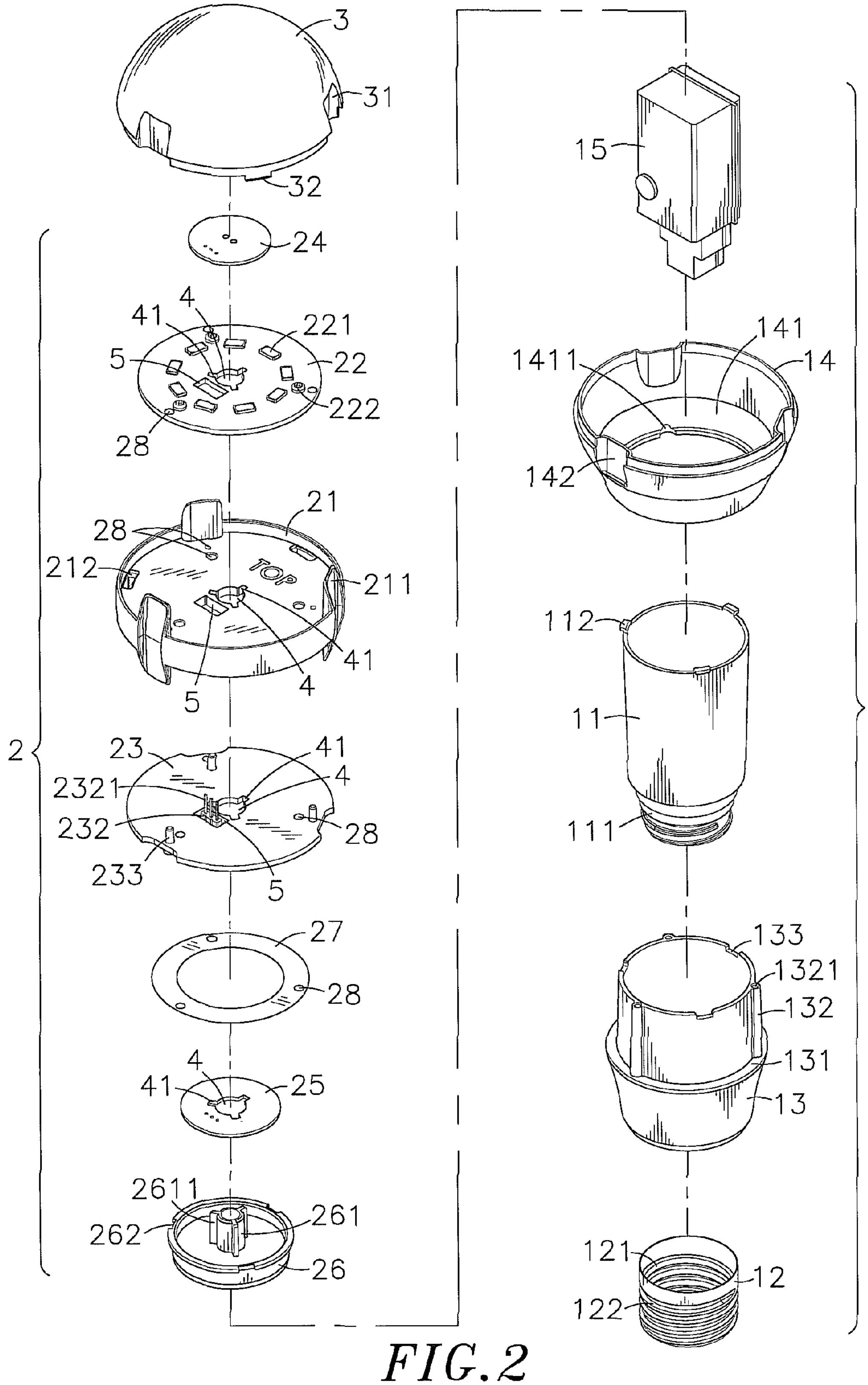
FIG. 2 is an exploded view of the light bulb in accordance with the present invention.
Figure 3:
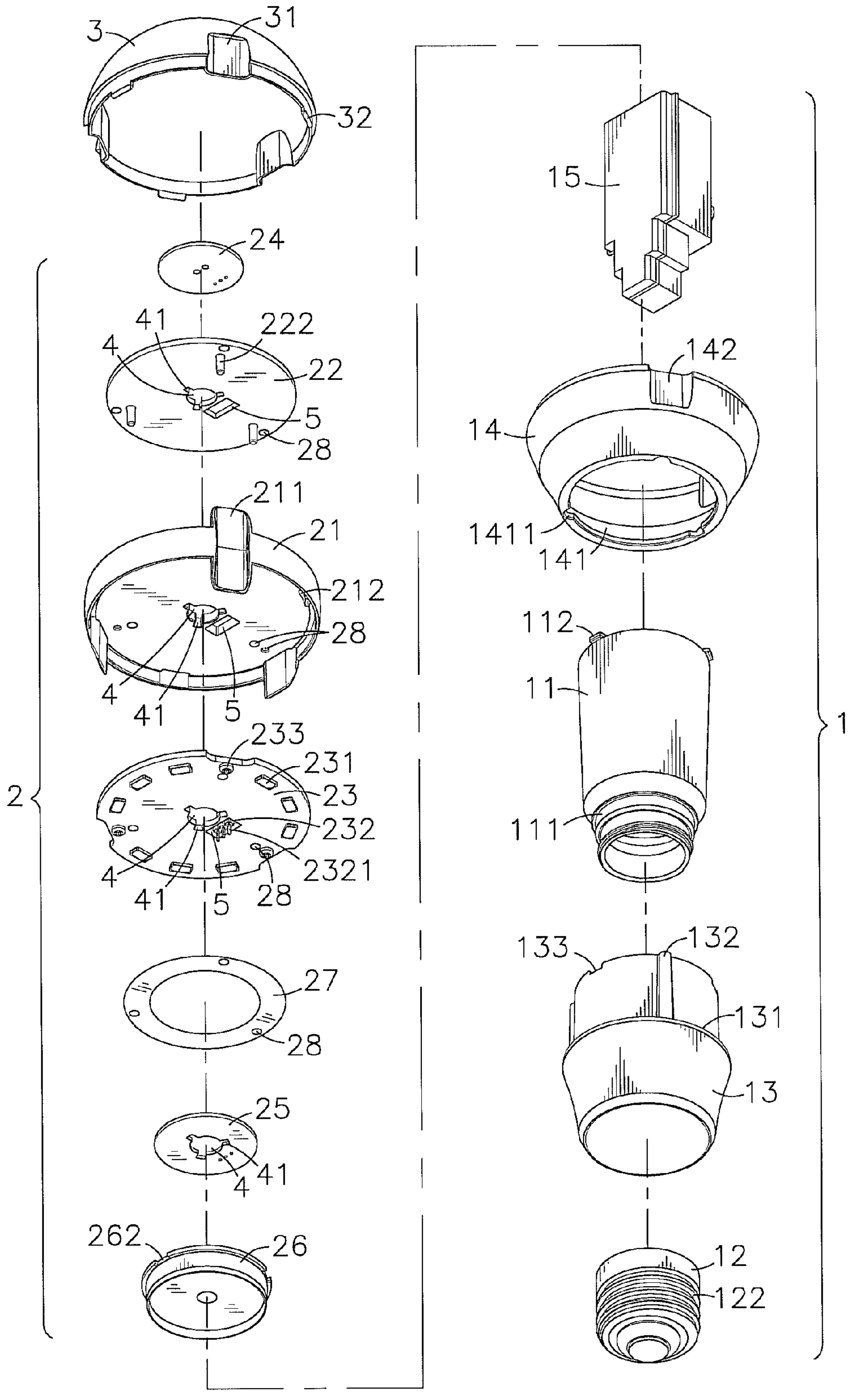
FIG. 3 is similar to FIG. 2 when viewed from another angle.
Figure 4:
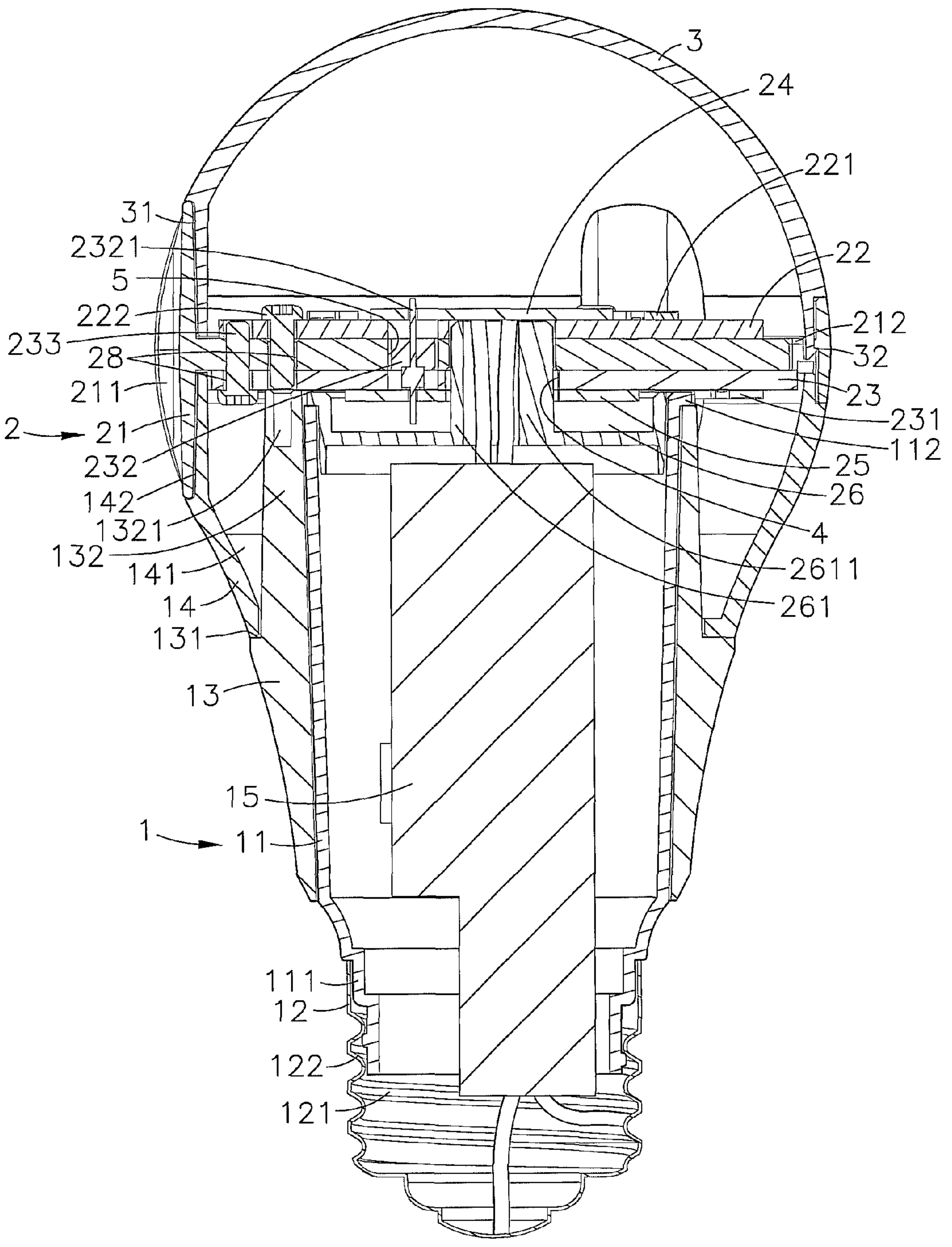
FIG. 4 is a sectional view of the light bulb in accordance with the present invention.
Figure 5:
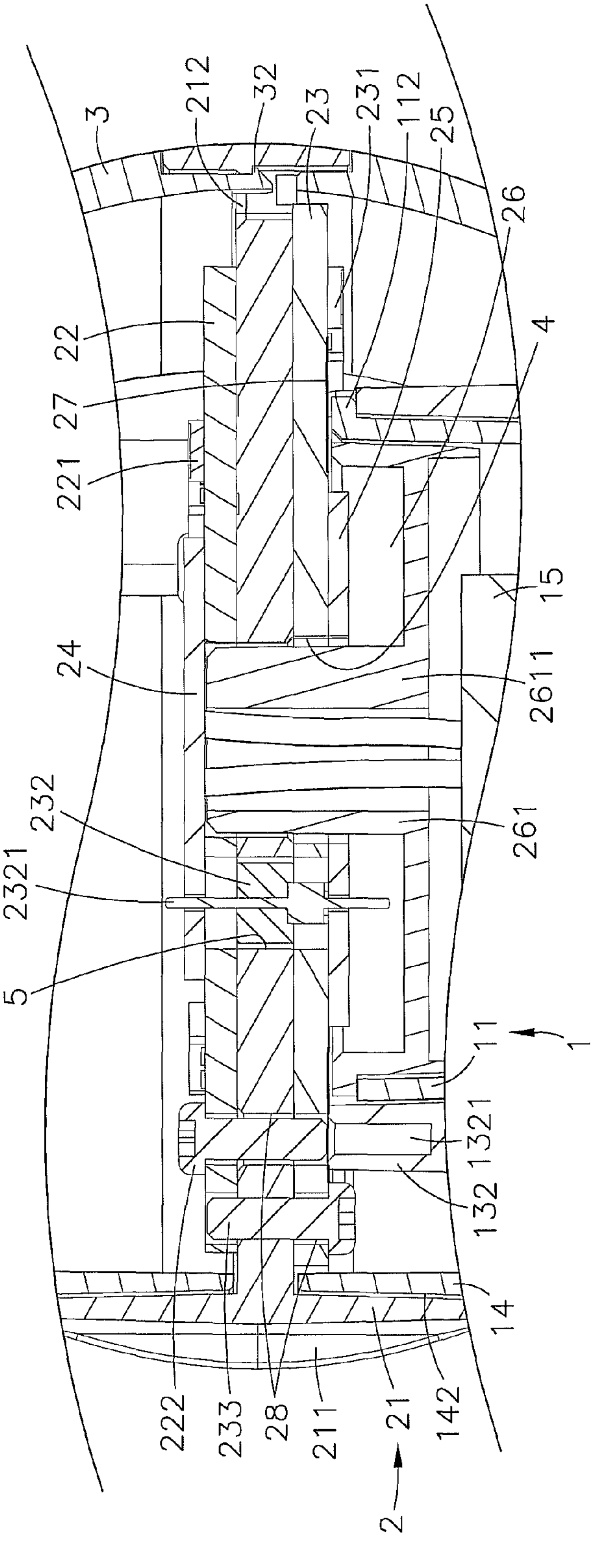
FIG. 5 is an enlarged view of a part of FIG. 4.

Referring to FIGS. 1-5, a light bulb in accordance with the present invention is shown. The light bulb comprises a lamp base unit 1, a light source module 2, and a lamp shell 3.

The lamp base unit 1 comprises an electrically insulative hollow column 11, which comprises an externally threaded coupling neck 111 disposed at the bottom side thereof and a plurality of hooks 112 equiangularly disposed at the opposing top side thereof, a base 12, which is configured like the base of a conventional incandescent bulb having a ring contact and a tip contact for connecting the positive and negative terminals of a power source and, which comprises an inner thread 121 located on the inner perimeter thereof and threaded onto the externally threaded coupling neck 111 of the electrically insulative hollow column 11 and an outer thread 122 located on the outer perimeter thereof for threading into an external lamp socket (not shown), a metal cylindrical heat sink 13, which surrounds the electrically insulative hollow column 11 and which comprises an annular step 131 extending around the outer perimeter thereof, a plurality of longitudinal female studs 132 formed integral with and equiangularly spaced around the outer perimeter, a screw hole 1321 located on the top side of each longitudinal female stud 132 and a plurality of locating notches 133 equiangularly disposed at the top side thereof in a staggered manner relative to the longitudinal female studs 132 and respectively forced into engagement with the hooks 112 of the electrically insulative hollow column 11, a light-transmissive shade 14, which surrounds an upper part of the metal cylindrical heat sink 13 and which comprises a tapered bottom part 141 fitting the outer perimeter of the metal cylindrical heat sink 13 and supported on the annular step 131 of the metal cylindrical heat sink 13, a plurality of mating notches 1411 equiangularly disposed at the inner perimeter of the tapered bottom part 141 and adapted to accommodate the longitudinal female studs 132 of the metal cylindrical heat sink 13 and a plurality of retaining grooves 142 equiangularly spaced around the outer perimeter at the top side, and a power supply module 15 mounted inside the electrically insulative hollow column 11 and electrically connected to the ring contact and tip contact of the base 12.

The light source module 2 comprises a metal holder plate 21, a first circuit board 22, a second circuit board 23, a first adapter board 24, a second adapter board 25, a positioning block 26, and a heat transfer pad 27. The metal holder plate 21 is arranged at the top side of the electrically insulative hollow column 11 and light-transmissive shade 14 of the lamp base unit 1, comprising a plurality of retaining lugs 211 and retaining holes 212 alternatively arranged around the border area thereof. The respective bottom ends of the retaining lugs 211 of the metal holder plate 21 are respectively forced into engagement with the retaining grooves 142 of the light-transmissive shade 14. The first circuit board 22 is mounted at the top side of the metal holder plate 21, comprising a plurality of LEDs (light-emitting diodes) 221 disposed at the top wall thereof and electrically connected to the power supply module 15. Further, screws 222 are mounted at the first circuit board 22 and driven into the screw holes 1321 to affix the first circuit board 22, the metal holder plate 21, the second circuit board 23 and the heat transfer pad 27 to the lamp base unit 1. The second circuit board 23 is mounted at the bottom side of the metal holder plate 21 and supported on the head sink 13, comprising a plurality of LEDs (light-emitting diodes) 231 disposed at the bottom wall thereof and electrically connected to the power supply module 15 and an electric connector 232 electrically connected to the metal holder plate 21. The electric connector 232 comprises a plurality of upright contact pins 2321. Further, screws 233 are mounted at the second circuit board 23 and driven through the metal holder plate 21 into the first circuit board 22 to affix the first circuit board 22, the metal holder plate 21 and the second circuit board 23 together. The first adapter board 24 and the second adapter board 25 are respectively mounted at the top side of the first circuit board 22 and the bottom side of the second circuit board 23 and electrically connected to the upright contact pins 2321 of the electric connector 232 of the second circuit board 23. Further, the first adapter board 24 electrically connects the first circuit board 22 to the power supply module 15. The positioning block 26 is mounted at the bottom side of the second adapter board 25 and partially press-fitted into the top open side of the electrically insulative hollow column 11, comprising an upright post 261 disposed at the top center thereof, a plurality of ribs 2611 spaced around the periphery of the upright post 261, and a plurality of positioning notches 262 equiangularly spaced around the border of the top side thereof and respectively forced into engagement with the hooks 112 of the electrically insulative hollow column 11. The heat transfer pad 27 is an annular pad sandwiched between the second circuit board 23 and the metal cylindrical heat sink 13. Further, through holes 28 are respectively formed on the metal holder plate 21, the first circuit board 22, the second circuit board 23 and the heat transfer pad 27 for the passing of the screws 222; 233. Further, center openings 4 and notches 41 are respectively formed on the metal holder plate 21, the first circuit board 22, the second circuit board 23 and the second adapter board 25 for the passing of the upright post 261 and ribs 2611 of the positioning block 26. Further, connector holes 5 are respectively formed on the metal holder plate 21, the first circuit board 22 and the second circuit board 23 for accommodating the electric connector 232.

The lamp shell 3 is mounted at the top side of the metal holder plate 21, comprising a plurality of retaining grooves 31 equiangularly spaced around the periphery thereof and respectively forced into engagement with the respective top ends of the retaining lugs 211 of the metal holder plate 21, and a plurality of bottom hooks 32 extended from the bottom side thereof and arranged at equiangular intervals and respectively hooked in the retaining holes 212 of the metal holder plate 21.

The metal holder plate 21 of the light source module 2 is made of a metal material having excellent thermal conductivity, for example, aluminum or aluminum magnesium alloy. The LEDs 221 of the first circuit board 22 are facing upward and the LEDs 231 of the second circuit board 23 are facing down. Thus, the light source module 2 provides a wide range of illumination. Further, the first circuit board 22 and the second circuit board 23 are respectively kept in close contact with the opposing top and bottom walls of the metal holder plate 21 for quick dissipation of waste heat during operation of the LEDs 221; 231. Further, subject to engagement between the retaining lugs 211 of the metal holder plate 21 and the retaining grooves 31; 142 of the lamp shell 3 and light-transmissive shade 14, the lamp shell 3 and the light-transmissive shade 14 are firmly secured together to show a view of a bulb shape.

Further, the light-transmissive shade 14 and the lamp shell 3 can be selected from a group of transparent or translucent materials. Further, the light-transmissive shade 14 and the lamp shell 3 can be separately made, and then fastened together. Alternatively, the light-transmissive shade 14 and the lamp shell 3 can be made in one piece.

Further, the light bulb not only uses the metal holder plate 21 to dissipate waste heat from the first circuit board 22 and the second circuit board 23, but also has the heat transfer pad 27 be sandwiched between the heat sink 13 and the second circuit board 23 to transfer waste heat from the second circuit board 23 to the heat sink 13 for quick dissipation. Thus, waste heat can be quickly dissipated from the light source module 2 during operation of the LEDs 221; 231 to keep the LEDs 221; 231 under an optimal working environment, thereby prolonging the lifespan of the light bulb.

Further, the number of the retaining lugs 211 of the metal holder plate 21 can be 2, 3, 4 or 5, subject to the installation amount of the LEDs 221; 231 and the overall power watt level of the light bulb. Further, the amount and locations of the retaining grooves 31; 142 of the lamp shell 3 and light-transmissive shade 14 are determined subject to the amount and locations of the retaining lugs 211 of the metal holder plate 21. Thus, the retaining lugs 211 of the metal holder plate 21 also work as radiation fins to dissipate waste heat being received by the metal holder plate 21 from the LEDs 221; 231 of the first and second circuit boards 22; 23.

Further, the power supply module 15 has its bottom terminal electrically connected to the base 12 by electric wires, and its top terminal electrically connected to the first adapter board 24 by electric wires. The first adapter board 24 and the second adapter board 25 are respectively electrically bonded to the first circuit board 22 and the second circuit board 23 by spot welding. The first adapter board 24 and the second adapter board 25 are electrically connected by means of the electric connector 232. If electric wires are used to electrically connect the first circuit board 22, the second circuit board 23, the first adapter board 24 and the second adapter board 25, the welding procedure will be complicated, and an accommodate space must be provided for accommodating the electric wires. Using the electric connector 232 to electrically connect the first circuit board 22, the second circuit board 23, the first adapter board 24 and the second adapter board 25 simply needs to make the connector holes 5 on the metal holder plate 21, the first circuit board 22 and the second circuit board 23 for accommodating the electric connector 232, simplifying the installation procedure.

Instead of the aforesaid arrangement to electrically connect the electric wires at the top terminal of the power supply module 15 to the first adapter board 24, the electric wires at the top terminal of the power supply module 15 can be electrically connected to the second adapter board 25 to provide power supply to the second adapter board 25, enabling the second adapter board 25 to transmit power supply to the second circuit board 23 and the first circuit board 22.

Further, the upper part of the outer perimeter of the heat sink 13 above the elevation of the annular step 131 can be tapered to reflect the light emitted by the downward-facing LEDs 231 of the second circuit boards 23, enhancing lateral and rear side illumination. Further, the outer perimeter of the heat sink 13 can be covered with a reflecting coating, enhancing reflection. Further, a lamp socket for light bulb may be equipped with a reflector for reflecting backward and lateral light toward the front side. Subject to the arrangement of the downward-facing LEDs 231 of the second circuit boards 23 and the light reflection function of the head sink 13, the light bulb of the present invention enhances lateral and backward illumination for reflection by the reflector at the lamp socket toward the front side, enhancing the brightness.

In actual application, the light bulb of the present invention has the features and advantages as follows:

1. The metal holder plate 21 of the light source module 2 is kept in close contact with the first circuit board 22 and the second circuit board 23 for quick dissipation of waste heat produced during operation of the LEDs 221; 231, and works to hold the light-transmissive shade 14 and the lamp sell 3 firmly in place.
2. In addition to the functioning of the metal holder plate 21 to dissipate waste heat from the first circuit board 22 and the second circuit board 23, the heat transfer pad 27 and the heat sink 13 can also dissipate waste heat from the second circuit board 22; the mounting lugs 211 of the metal holder plate 21 also work as radiation fins to dissipate waste heat during operation of the LEDs 221; 231; the number of the mounting lugs 211 can be determined subject to the installation quantity of the LEDs 221; 231, and thus if the quantity or power watt of the LEDs 221; 231 is increased, the total heat dissipation surface area of the mounting lugs 211 can be relatively increased.
3. The first adapter board 24 and the second adapter board 25 are respectively electrically connected to the first circuit board 22 and the second circuit board 23 by spot welding, and the first adapter board 24 and the second adapter board 25 are electrically connected together by means of the electric connector 232; by means of inserting the electric connector 232 into the connector holes 5 and bonding it to the second circuit board 2 and then bonding the first adapter board 24 to the upright contact pins 2321 of the electric connector 232, the electric connection is done.
4. The upper part of the outer perimeter of the heat sink 13 above the elevation of the annular step 131 is tapered for reflecting the light emitted by the downward-facing LEDs 231 of the second circuit board 23, enhancing lateral and rear side illumination that passes through the light-transmissive shade 14.

In conclusion, the light bulb of the present invention comprises a lamp base unit, which comprises a base connectable to a lamp socket, an electrically insulative hollow column fastened to the base, a heat sink surrounding the electrically insulative hollow column, a light-transmissive shade surrounding the upper part of the metal cylindrical heat sink and a power supply module mounted in the electrically insulative hollow column and electrically connected to the base, a light source module consisting of a metal holder plate, a first circuit board with upward-facing LEDs, a second circuit board with downward-facing LEDs, a first adapter board, a second adapter board, a positioning block and a heat transfer pad and supported on the heat sink in the light-transmissive shade, and a lamp shell fastened to the metal holder plate and capped on the light-transmissive shade. During operation of the upward-facing and downward-facing LEDs, waste heat can be quickly dissipated into the outside open air through the mounting lugs of the metal holder plate, the heat transfer pad and the heat sink.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A light bulb, comprising:

a lamp base unit comprising a base electrically connectable to an external lamp socket, an electrically insulative hollow column mounted at said base, a metal cylindrical heat sink surrounding said electrically insulative hollow column, a light-transmissive shade surrounding an upper part of said metal cylindrical heat sink, and a power supply module accommodated in said electrically insulative hollow column and electrically connected to said base;

a light source module comprising a metal holder plate supported on said electrically insulative hollow column and said light-transmissive shade, a first circuit board attached to a top wall of said metal holder plate and electrically connected to said power supply module, said first circuit board comprising a plurality of upward-facing light-emitting diodes, and a second circuit board attached to a bottom wall of said metal holder plate and electrically connected to said power supply module, said second circuit board comprising a plurality of downward-facing light-emitting diodes; and a light transmitting lamp shell fastened to said metal holder plate and capped on said light-transmissive shade, wherein said light source module further comprises an electric connector mounted at said second circuit board and electrically connected to said first circuit board, said electric connector comprising a plurality of upright contact pins, a first adapter board mounted at a top side of said first circuit board and bonded to said upright contact pins of said electric connector and electrically connected to said power supply module, a second adapter board mounted at a bottom side of said second circuit board and bonded to said upright contact pins of said electric connector; said metal holder plate, said first circuit board and said second circuit board each comprise a connector hole for accommodating said electric connector.

2. The light bulb as claimed in claim 1, wherein said electrically insulative hollow column comprises an externally threaded coupling neck disposed at a bottom side thereof; said base comprises an inner thread located on an inner perimeter thereof and threaded onto the externally threaded coupling neck of said electrically insulative hollow column, and an outer thread located on an outer perimeter thereof for threading into an external lamp socket.

3. The light bulb as claimed in claim 1, wherein said electrically insulative hollow column comprises a plurality of hooks equiangularly disposed at a top side thereof; said metal cylindrical heat sink is stopped against a bottom wall of said second circuit board and comprises a plurality of locating notches equiangularly disposed at a top side and respectively forced into engagement with the hooks of said electrically insulative hollow column; said light source module further comprises the first adapter board attached to a top wall of said first circuit board opposite to said metal holder plate, the second adapter board attached to the bottom wall of said second circuit board opposite to said metal holder plate, and a positioning block attached to a bottom wall of said second adapter board, said positioning block comprising a plurality of positioning notches equiangularly spaced around the border of a top side thereof and respectively forced into engagement with the hooks of said electrically insulative hollow column.

4. The light bulb as claimed in claim 3, wherein said second adapter board, said second circuit board, said metal holder plate and said first circuit board each comprise a center opening and a plurality of notches in communication with said center opening; said positioning block further comprises an upright post disposed at a top center thereof and inserted through the center openings of said second adapter board, said second circuit board, said metal holder plate and said first circuit board, and a plurality of ribs spaced around the periphery of said upright post and engaged into the notches that are located on said second adapter board, said second circuit board, said metal holder plate and said first circuit board in communication with the respective said center openings.

5. The light bulb as claimed in claim 3, wherein said light source module further comprises a heat transfer pad sandwiched between said second circuit board and said metal cylindrical heat sink and adapted to transfer waste heat from said second circuit board to said heat sink.

6. The light bulb as claimed in claim 1, wherein said metal cylindrical heat sink further comprises an annular step extending around an outer perimeter thereof, a plurality of longitudinal female studs formed integral with and equiangularly spaced around the outer perimeter and a screw hole located on a top side of each longitudinal female stud; said light-transmissive shade comprises a tapered bottom part fitting the outer perimeter of said metal cylindrical heat sink and supported on said annular step of said metal cylindrical heat sink and a plurality of mating notches equiangularly disposed at an inner perimeter of said tapered bottom part and adapted to accommodate said longitudinal female studs of said metal cylindrical heat sink; said first circuit board, said metal holder plate, said second circuit board and a heat transfer pad each comprise a plurality of through holes; said light source module further comprises a plurality of screws respectively mounted in the through holes of said first circuit board, said metal holder plate, said second circuit board and said heat transfer pad and threaded into the screw holes at said longitudinal female studs of said metal cylindrical heat sink to affix said light source module to said metal cylindrical heat sink.

7. The light bulb as claimed in claim 1, wherein said metal holder plate comprises a plurality of retaining lugs equiangularly spaced around the border area thereof; said light-transmissive shade comprises a plurality of retaining grooves respectively forced into engagement with respective bottom ends of said retaining lugs of said metal holder plate; said light transmitting lamp shell comprises a plurality of retaining grooves respectively forced into engagement with respective top ends of said retaining lugs of said metal holder plate.

8. The light bulb as claimed in claim 1, wherein said metal holder plate comprises a plurality of retaining holes arranged at equiangular intervals; said light transmitting lamp shell comprises a plurality of bottom hooks extended from a bottom side thereof and arranged at equiangular intervals and respectively hooked in the retaining holes of said metal holder plate.

9. The light bulb as claimed in claim 1, wherein said metal holder plate comprises a plurality of through holes; said second circuit board is provided with a plurality of screws that are inserted through the through holes of said metal holder plate and fastened to said first circuit board.

* * * * *